United States Patent Office 3,355,383
Patented Nov. 28, 1967

3,355,383
POLYHALOPHENYLTHIOALIPHATIC ACIDS
AND THEIR ESTERS AND SALTS
Gilbert H. Berezin, Walnut Creek, Guy H. Harris, Concord, and Bryant C. Fischback, Walnut Creek, Calif., assignors to The Dow Chemical Company, Midland, Mich., a corporation of Delaware
No Drawing. Filed July 13, 1959, Ser. No. 826,462
25 Claims. (Cl. 252—33.6)

The present invention relates to a new class of lubricants, to wit: lubricant fluids comprising the polyhalophenylthioaliphatic acids and their esters and salts. More particularly the present invention concerns novel penta and tetra phenylthioaliphatic acids and their esters and salts and to novel compositions of tetra and penta halo phenylthioaliphatic acids, esters and salts thereof which are useful as lubricants. The novel polyhalophenylthioaliphatic compounds of the present invention are those characterized by the formula

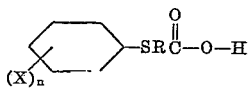

wherein in this and succeeding formulae R represents a bivalent saturated aliphatic hydrocarbon radical containing from 1 to 18 carbon atoms which may contain a halogen substituent adjacent to the point of attachment to the sulfur molecule, and having an atomic number of 17 to 35, inclusive, each X is a halogen atom having an atomic number of 17 to 35, inclusive, and $n$ is an integer from 4 to 5, inclusive, and their alkali metal, alkaline earth metal, ammonium, alkyl- and alkanolamine and polyalkylene polyamine salts and their alkyl esters.

It has been found that minor quantities of the above-identified compounds increase the lubricating properties of aqueous or oil lubricant compositions. Thus, when from 0.1 to 20 percent of one of the compounds of the present invention is admixed with a lubricant composition there is observed a 4 to 12-fold increase in the lubricity of the system.

The compounds of the present invention may be prepared by reacting a polyhalophenylthiol compound having the following formula:

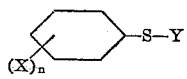

wherein $n$ has the aforesaid significance and Y represents sodium, hydrogen, or chlorine, with an olefinic or chloroaliphatic acid, amide or nitrile. The reaction proceeds smoothly at temperatures of from about 0° C. to about 150° C. The desired product may be recovered by conventional methods such as by filtration or decantation. The esters and salts of these components can be prepared in conventional manner.

In one manner of carrying out the present invention a polyhalobenzenethiol sodium salt is reacted with a haloaliphatic acid under conditions such that the sodium salt of the halogen is liberated and the thioaliphatic acid product is obtained. In another manner the polyhalobenzenethiol is added across an active double bond of an unsaturated aliphatic acid, amide or nitrile. In the case of the amide or nitrile, hydrolysis thereof produces the desired product. In still another reaction a polyhalophenylsulfenyl halide is added to a double bond of an olefinic acid. In the latter case the halogen atom adds to one carbon and the polyhalobenzenethiol adds to an adjacent carbon atom.

In the application of the compounds of the present invention as a lubricant, a compound having the formula

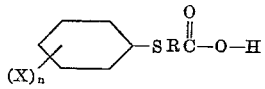

or its salt or ester, is admixed with a lubricant base as for example mineral oils, synthetic lubricating oils, and the like, such as polyoxyalkylene glycols and the ethers and esters of such glycols, the alkyl esters of dicarboxylic acids, and the alkanoic esters of aliphatic dihydroxy compounds (aliphatic diols), organic solvent or aqueous systems. It is to be understood that when a single phase system is desired the acid, salt or ester may be dissolved in water or other suitable solvent and the latter solution dispersed in the lubricating system. Further, concentrate compositions containing from 1 to 50 or more percent of the additive in water, polyglycol, polygylcol-water or oil base or organic solvent systems compatible with lubricant systems may be employed to introduce the additive to the lubricating system. Thus, the concentrate may or may not be a lubricating composition per se but is primarily intended to be a convenient means of introducing the additive to normal commercial lubricating systems.

Compounds which can be employed in accordance with the present invention are, for example, the 2-(pentachlorophenylthio) alkanoic acids, such as 2-(pentachlorophenylthio) acetic acid, -propionic acid, -butyric acid, -pentanoic acid, -hexanoic acid, -heptanoic acid, -octanoic acid, -octadecanoic acid, mono- chloro- or bromo- propionic, -pentanoic, -butyric, -caproic, -hexanoic, -octanoic, -octadecanoic acids and the like, and their alkali metal, alkaline earth metal, ammonium, alkanolamine, alkylamine and polyalkylene polyamine salts such as sodium, potassium, calcium, barium, strontium, lithium, ammonium, ethanolamine, diethanolamine, triethanolamine, ethylamine, diethylamine, triethylamine, and polyethylenepolyamine salts and their alkyl esters, such as methyl, ethyl, propyl, butyl esters and the corresponding pentabromophenylthio compounds.

The following examples, illustrate the present invention but are not to be construed as limiting.

*Example 1.—2-(pentachlorophenylthio)acetic acid*

Two hundred eighty-three grams of pentachlorobenzenethiol was suspended in three liters of water and 100 ml. of 50 percent aqueous sodium hydroxide was added. To the resulting solution there was added 128 grams of sodium chloroacetate dissolved in 300 ml. water. The system was heated to boiling for one hour and then treated with an amount of concentrated hydrochloric acid sufficient to lower the pH of the reaction mixture to one, whereupon a 2-(pentachlorophenylthio) acetic acid product precipitated in the reaction mixture. The mixture was cooled to 5° C. and the product was filtered, washed well with water and air dried. As a result of these operations there was obtained 324.6 grams (95.3 percent of the theoretical yield) of the desired product. The product was found to melt at 158.0–160.5° C.

*Example 2.—9-chloro-10-(pentachlorophenylthio) octadecanoic acid*

Twenty-eight and one tenth grams of oleic acid dissolved in 250 milliliters of ethylene dichloride was added with stirring to 37.1 grams of pentachlorophenylsulfenyl chloride dissolved in 250 milliliters of ethylene dichloride. After one hour the orange color disappeared and the ethylene dichloride was removed by vacuum distillation below 40° C. Yield of product remaining in the pot was quantitative. The product was an oil and had a neutralization equivalent of 524. Theory requires 560.

*Example 3.—3-(pentachlorophenylthio)propionic acid*

Twenty grams of pentachlorobenzenethiol was suspended in 65 milliliters of water and aqueous sodium hydroxide was added until a pH of 8 was attained and the thiol dissolved. Four grams of acrylamide was added with stirring and the clear solution was allowed to stand for 24 hours at 25° C. During this period of time a precipitate formed in the reaction mixture which was filtered off, washed with water and dried. Five grams of a 3-(pentachlorophenylthio)propionamide product was obtained melting at 177–182° C.

Seven grams of the amide as prepared above was dissolved in 50 milliliters of concentrated sulfuric acid and the resulting solution was poured into 200 milliliters of glacial acetic acid. To the solution cooled to 0° C. there was added with stirring a 20 percent excess of sodium nitrite dissolved in a minimum quantity of water. A precipitate formed in the reaction mixture, was collected by minimum of water was added. The precipitate which formed was collected, washed, and air dried. As a result of these operations there was obtained 3.1 grams of a 2-chloro-3-(pentachlorophenylthio) propionic acid product which was found to melt at 184°–186° C.

The methyl ester of the aforesaid acid formed by dissolving 35 grams of the acid in boiling methanol was treated with a 20 percent excess aqueous sodium hydroxide. The solution was heated on the steam bath for a few minutes and was then acidified with sulfuric acid. As a result of these operations a precipitate formed in the reaction mixture and was recovered to obtain nine grams of 3-(pentachlorophenylthio)acrylic acid melting at 220°–225° C.

*Example 5*

A Timkin lubricant tester designed to measure the film strength of lubricants was employed to test the maximum load at which a rotating bearing failed to rupture a lubricant film. The following table lists the film composition and the load at which the film was ruptured.

| Lubricant Composition, percent | | Additive | Percent | Pounds/load Rupture Film |
|---|---|---|---|---|
| Water | Organic | | | |
| 100 | 0 | | 0 | 3 |
| 90 | 1 10 | | 0 | 5 |
| 90 | 1 8.92 | 2-(pentachlorophenylthio)acetic acid | 1.06 | 45 |
| 90 | 1 9.39 | Monoethanolammonium 2-(pentachlorophenylthio)acetate | 0.61 | 25 |
| 90 | 1 9.09 | Diethanolammonium 2-(pentachlorophenylthio)acetate | 0.91 | 35 |
| 90 | 1 9.00 | Triethanolammonium 2-(pentachlorophenylthio)acetate | 1.00 | 45 |
| 90 | 1 8.16 | Polyglycolamine salt of 2-(pentachlorophenylthio)acetic acid 2 | 1.84 | 50 |
| 97 | 0 | do. 2 | 3.0 | 60 |
| 90 | 1 8.77 | do. 3 | 1.23 | 35 |
| 90 | 1 8.73 | do. 4 | 1.27 | 25 |
| 90 | 1 9 | Sodium 2-(pentachlorophenylthio)acetate | 1.00 | 35 |
| 90 | 1 9 | 3-(pentachlorophenylthio)propionic acid | 1.00 | 35 |
| 90 | 1 9 | 2-chloro-3-(pentachlorophenylthio)propionic acid | 1.00 | 37 |
| 90 | 1 9 | Triethanolammonium 2-chloro-3-(pentachlorophenylthio)propionate | 1.00 | 22 |
| 90 | 1 9 | Triethanolammonium 3-(pentachlorophenylthio)acrylate | 1.00 | 22 |
| 90 | 1 9 | 9-chloro-10-(pentachlorophenylthio)octadecanoic acid | 1.00 | 20 |
| | 5 95 | Methyl 2-(pentachlorophenylthio)acetate | 5.0 | 45 |

1 Tall oil fatty acids esterified with a polyglycol made from 4 moles of propylene oxide and 12 moles of ethylene oxide.
2 Tertiary polyglycolamine made by condensation of a 50-50 mixture of ethylene oxide and propylene oxide with ethanolamine to give a molecular weight of 538.
3 A reaction product of isopropanolamine with three moles of propylene oxide.
4 Reaction product of monoethanolamine with average of 4.9 moles of ethylene oxide.
5 Mineral oil.

filtration, washed well with water, and air dried to obtain four grams of solid 3-(pentachlorophenylthio)propionic acid product melting at 170°–176° C.

*Example 4.—3-(pentachlorophenylthio)acrylic acid*

Twenty-five grams of pentachlorophenylsulfenyl chloride was dissolved in 75 milliliters of methylene dichloride and 10 grams of acrylamide dissolved in 20 milliliters of methylene dichloride was added with stirring. After about one minute a precipitate formed. The solution was allowed to stand 30 minutes longer at 30° C. The mixture was then cooled to 5° C. and the solid which had formed was filtered off. As a result of these operations there was obtained 15.2 grams of crude 2-chloro-3-(pentachlorophenylthio)propionamide product melting at 155°–156° C. A second crop of crystals of this compound was obtained by concentration of the mother liquor. This crop weighed 2.5 grams and melted at 166°–167° C. Twenty grams of crude product was recrystallized from two liters of ethylene dichloride and 13.5 grams of purified product obtained melting at 180°–185° C. A further recrystallization from ethylene dichloride raised the melting point to 187.5°–188.0° C.

Five and two-tenths grams of 2-chloro-3-(pentachlorophenylthio)propionamide was dissolved in 40 milliliters of concentrated sulfuric acid and this solution added to 300 ml. of glacial acetic acid. The resulting solution was cooled to 0° C. and an excess of sodium nitrite in a

*Example 6.—2-(2,3,5,6-tetrachlorophenylthio)acetic acid*

Two hundred eighty-three grams of 2,3,5,6-tetrachlorobenzenethiol is suspended in three liters of water and 100 ml. of 50 percent aqueous sodium hydroxide was added. To the resulting solution there is added 128 grams of sodium chloroacetate dissolved in 300 ml. water. The system is heated to boiling for one hour and then treated with an amount of concentrated hydrochloric acid sufficient to lower the pH of the reaction mixture to one, whereupon a 2-(2,3,5,6-tetrachlorophenylthio)acetic acid product precipitates in the reaction mixture. The mixture is cooled to 5° C. and the product filtered, washed well with water and air dried. 2-(2,3,5,6-tetrachlorophenylthio)acetic acid has a molecular weight of 273 and is useful as a lubricant additive.

Thus, it is apparent that any tetra- or pentahalo-phenylthioaliphatic acid having the general formula

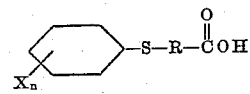

wherein $n$ is an integer from 4 to 5 or its salts or esters, may be employed in accordance with the present invention and when so employed will impart superior lubricating properties to any lubricant system to which they are added.

This is a continuation-in-part of our copending application for United States Letters Patent having United States Ser. No. 699,923, filed Dec. 2, 1957, now abandoned.

We claim:

1. A lubricant composition consisting essentially of a lubricant base and from 0.1 percent to 20 percent by weight of a compound selected from the group consisting of those acids having the formula

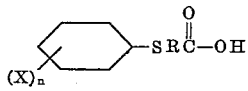

wherein R is a saturated aliphatic hydrocarbon radical containing from 1 to 18 carbon atoms, inclusive, and the halogenated derivatives thereof, said halogen substituent having an atomic number of 17 to 35 and X is a halogen substituent having an atomic number from 17 to 35 inclusive, and $n$ is an integer from 4 to 5, inclusive, and their alkali metal, alkaline earth metal, ammonium, alkylamine and alkanolamine salts and lower alkyl esters.

2. A lubricant composition consisting essentially of a mineral oil base and from 0.1 percent to 20 percent by weight of a compound selected from the group consisting of those acids having the formula

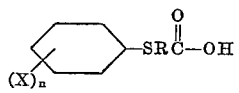

wherein R is a saturated aliphatic hydrocarbon radical containing from 1 to 18 carbon atoms, inclusive, and the halogenated derivatives thereof, said halogen substituent having an atomic number of 17 to 35 and X is a halogen substituent having an atomic number from 17 to 35, inclusive, and $n$ is an integer from 4 to 5, inclusive, and their alkali metal, alkaline earth metal, ammonium, alkylamine and alkanolamine salts and lower alkyl esters.

3. A lubricant composition consisting essentially of a tall oil fatty acid esterified with a polyglycol and from 0.1 percent to 20 percent by weight of a compound selected from the group consisting of those acids having the formula

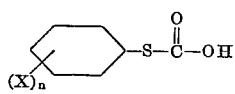

wherein R is a saturated aliphatic hydrocarbon radical containing from 1 to 18 carbon atoms, inclusive, and the halogenated derivatives thereof, said halogen substituent having an atomic number of 17 to 35 and X is a halogen substituent having an atomic number from 17 to 35, inclusive, and $n$ is an integer from 4 to 5, inclusive and their alkali metal, alkaline earth metal, ammonium, alkylamine and alkanolamine salts and lower alkyl esters.

4. A lubricant composition as set forth in claim 2 wherein $n$ is 4.

5. A lubricant composition as set forth in claim 2 wherein $n$ is 5.

6. A lubricant composition as set forth in claim 3 wherein $n$ is 4.

7. A lubricant composition as set forth in claim 3 wherein $n$ is 5.

8. A lubricant composition as set forth in claim 1 wherein $n$ is 4.

9. A lubricant composition as set forth in claim 1 wherein $n$ is 5.

10. A method for lubricating contacting moving parts which comprises supplying to the surfaces of said parts a lubricant composition consisting essentially of a lubricant base and from 0.1 percent to 20 percent by weight of a compound selected from the group consisting of those acids having the formula

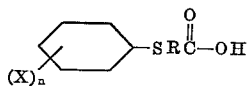

wherein R is a saturated aliphatic hydrocarbon radical containing from 1 to 18 carbon atoms, inclusive, and the halogenated derivatives thereof, said halogen substituent having an atomic number of 17 to 35 and X is a halogen substituent having an atomic number from 17 to 35 inclusive, and $n$ is an integer from 4 to 5, inclusive, and their alkali metal, alkaline earth metal, ammonium, alkylamine and alkanolamine salts and lower alkyl esters.

11. A method for lubricating contacting moving parts which comprises supplying to the surfaces of said parts a lubricant composition consisting essentially of a mineral oil base and from 0.1 percent to 20 percent by weight of a compound selected from the group consisting of those acids having the formula

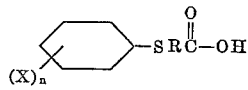

wherein R is a saturated aliphatic hydrocarbon radical containing from 1 to 18 carbon atoms, inclusive, and the halogenated derivatives thereof, said halogen substituent having an atomic number of 17 to 35 and X is a halogen substituent having an atomic number from 17 to 35, inclusive, and $n$ is an integer from 4 to 5, inclusive, and their alkali metal, alkaline earth metal, ammonium, alkylamine and alkanolamine salts and lower alkyl esters.

12. A method for lubricating contacting moving parts which comprises supplying to the surfaces of said parts a lubricant composition consisting essentially of a tall oil fatty acid ester of a polyglycol and from 0.1 percent to 20 percent by weight of a compound selected from the group consisting of those acids having the formula

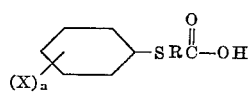

wherein R is a saturated aliphatic hydrocarbon radical containing from 1 to 18 carbon atoms, inclusive, and the halogenated derivatives thereof, said halogen substituent having an atomic number of 17 to 35 and X is a halogen substituent having an atomic number from 17 to 35, inclusive, and $n$ is an integer from 4 to 5, inclusive, and their alkali metal, alkaline earth metal, ammonium, alkylamine and alkanolamine salts and lower alkyl esters.

13. The method as set forth in claim 11 wherein $n$ is 4.
14. The method as set forth in claim 11 wherein $n$ is 5.
15. The method as set forth in claim 12 wherein $n$ is 4.
16. The method as set forth in claim 12 wherein $n$ is 5.
17. The method as set forth in claim 10 wherein $n$ is 4.
18. The method as set forth in claim 10 wherein $n$ is 5.

19. A lubricating composition consisting essentially of a lubricating oil and, as an extreme pressure additive, from about 0.1% to about 20% by weight of the total composition, of a chlorinated aromatic sulfur compound selected from the class consisting of pentachlorophenylmercaptoacetic acid, and esters of pentachlorophenylmercaptoacetic acid.

20. The lubricating composition of claim 19 wherein the said lubricating oil is a synthetic lubricant fluid.

21. The lubricating composition of claim 19 wherein the said extreme pressure additive is pentachlorophenylmercaptoacetic acid.

22. A lubricating composition consisting of a lubricating oil and, as an extreme pressure additive, an amount which is at least about 0.1% based on the weight of the total composition, said amount being sufficient to produce extreme pressure properties, of a chlorinated aromatic sulfur compound selected from the class consisting of pentachlorophenylmercaptoacetic acid, and esters of pentachlorophenylmercaptoacetic acid.

23. The lubricating composition of claim 22 wherein the said extreme pressure additive is pentachlorophenylmercaptoacetic acid.

24. The lubricating composition of claim 22 wherein the said lubricating oil is a synthetic lubricant fluid.

25. The method of lubricating which comprises interposing between load-bearing sliding surfaces, a composition as defined in claim 19.

References Cited
UNITED STATES PATENTS

| | | | |
|---|---|---|---|
| 1,763,556 | 6/1930 | Herz et al. | 260—516 X |
| 1,988,501 | 1/1935 | Lubs et al. | 260—516 |
| 2,199,799 | 5/1940 | Jacobson | 260—470 |
| 2,322,761 | 6/1943 | Lontz. | |
| 2,354,550 | 7/1944 | Rosen | 252—33.6 |
| 2,449,992 | 9/1948 | Gresham et al. | 260—516 |
| 3,041,280 | 6/1962 | Smith et al. | 252—33.6 |

OTHER REFERENCES

"Synthetic Lubricants," by McTurk, October 1953, Wright Air Development Center Technical Report 53–88, pp. 26–28 pertinent. Reproduced by Document Service Center, Knott Building, Dayton, Ohio.

DANIEL E. WYMAN, *Primary Examiner.*

JULIUS GREENWALD, ALPHONSO D. SULLIVAN, *Examiners.*

G. O. ENOCKSON, P. C. BAKER, R. E. HUTZ, W. H. CANNON, *Assistant Examiners.*

UNITED STATES PATENT OFFICE
CERTIFICATE OF CORRECTION

Patent No. 3,355,383                  November 28, 1967

Gilbert H. Berezin et al.

It is hereby certified that error appears in the above numbered patent requiring correction and that the said Letters Patent should read as corrected below.

Column 5, lines 42 to 43, the formula should appear as shown below instead of as in the patent:

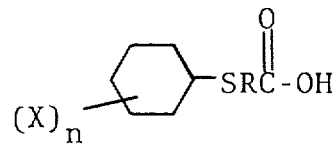

Signed and sealed this 14th day of January 1969.

(SEAL)
Attest:

Edward M. Fletcher, Jr.                  EDWARD J. BRENNER
Attesting Officer                          Commissioner of Patents